United States Patent
Cohen

(10) Patent No.: US 9,167,536 B2
(45) Date of Patent: Oct. 20, 2015

(54) METHOD AND APPARATUS FOR SIR ESTIMATION USING TIME MULTIPLEXED PILOTS AND TPC COMMANDS

(71) Applicant: QUALCOMM Incorporated, San Diego, CA (US)

(72) Inventor: Roee Cohen, Kibbutz Eyal (IL)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 14/056,218

(22) Filed: Oct. 17, 2013

(65) Prior Publication Data

US 2014/0307566 A1   Oct. 16, 2014

Related U.S. Application Data

(60) Provisional application No. 61/810,596, filed on Apr. 10, 2013.

(51) Int. Cl.
| | |
|---|---|
| *H04L 1/00* | (2006.01) |
| *H04W 52/22* | (2009.01) |
| *H04J 3/14* | (2006.01) |
| *H04W 52/24* | (2009.01) |
| *H04B 17/336* | (2015.01) |

(52) U.S. Cl.
CPC .......... *H04W 52/221* (2013.01); *H04B 17/336* (2015.01); *H04J 3/14* (2013.01); *H04W 52/241* (2013.01); *H04W 52/247* (2013.01); *H04W 52/248* (2013.01)

(58) Field of Classification Search
CPC ............ H04W 52/221; H04W 52/241; H04W 52/247; H04W 52/248
USPC ......................................................... 370/252
See application file for complete search history.

(56) References Cited

U.S. PATENT DOCUMENTS

| | | | |
|---|---|---|---|
| 6,088,324 A | 7/2000 | Sato | |
| 6,940,894 B2 | 9/2005 | Sendonaris | |
| 7,640,034 B2 | 12/2009 | Bomash | |
| 2006/0062284 A1* | 3/2006 | Li et al. .......................... | 375/148 |
| 2006/0252447 A1* | 11/2006 | Muharemovic et al. ....... | 455/522 |
| 2007/0149234 A1* | 6/2007 | Bomash ......................... | 455/522 |
| 2011/0164523 A1 | 7/2011 | Catreux-Erceg et al. | |

FOREIGN PATENT DOCUMENTS

WO    WO-2012/118415 A1    9/2012

OTHER PUBLICATIONS

Boujemaa, et al., "Prediction of the Received Power for the UMTS Closed Loop Power Control," PIMRC 2002, IEEE, pp. 1-5.
International Search Report and Written Opinion—PCT/US2014/032534—ISA/EPO—Jul. 16, 2014. (10 total pages).

* cited by examiner

*Primary Examiner* — Sai-Ming Chan
(74) *Attorney, Agent, or Firm* — Arent Fox LLP

(57) ABSTRACT

Methods and apparatus for improving amplitude estimation of a received signal in a wireless communication system is provided. Aspects of the methods and apparatus relate to investigating estimation of signal-to-noise (SNR) of the signal. To estimate SNR of the signal, a user equipment (UE) combines previous pilot amplitude measurements and the present pilot amplitude measurement along with received transmit power control (TPC) commands.

22 Claims, 11 Drawing Sheets

METHOD AND APPARATUS FOR SIR ESTIMATION USING TIME MULTIPLEXED PILOTS AND TPC COMMANDS

CLAIM OF PRIORITY UNDER 35 U.S.C §119

The present application for patent claims priority to U.S. Provisional Application No. 61/810,596 entitled "METHOD AND APPARATUS FOR SIR ESTIMATION USING TIME MULTIPLEXED PILOTS AND TPC COMMANDS" filed Apr. 10, 2013, and assigned to the assignee hereof and hereby expressly incorporated by reference.

BACKGROUND

Aspects of the present disclosure relate generally to wireless communication systems, and more particularly, to an apparatus and method for improving amplitude estimation of a received signal based on dedicated pilots and transmit power control commands (TPC) commands, thereby providing consistent service in a wireless communication system.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

Generally, in Code-Division-Multiple-Access (CDMA) systems, forward and reverse links periodically transmit dedicated pilot symbols every slot to estimate the channel. Signal-to-Noise Ratio (SNR) estimation based on those dedicated pilots is used for power control to maintain the required link quality while using the minimum transmitted power. The performance of the power control algorithm depends significantly on a good SNR estimate for proper operation. While noise power estimation can be taken from different sources (e.g., common pilot channel), the power of the relevant codeword can be estimated only from the codeword itself. However, since only a few dedicated pilots are received, power estimation based on the few dedicated pilots may be noisy and unreliable.

Thus, aspects of this apparatus and method for improving amplitude estimation of a received signal to provide consistent service in a wireless communication system.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods and apparatus for improving amplitude estimation of a received signal in a wireless communication system is provided. Aspects of the methods and apparatus relate to investigating estimation of SNR of the signal. To estimate SNR of the signal, a user equipment (UE) combines previous pilot amplitude measurements and the present pilot amplitude measurement along with stored TPC commands.

A method for improving amplitude estimation of a received signal is provided. The method includes storing TPC commands associated with a received signal. Additionally, the method includes storing an amplitude measurement for each slot associated with the received signal. Furthermore, the method includes computing an estimate amplitude for the received signal based on a weighted average of the stored amplitude measurement for each slot associated with the received signal and based on the stored TPC commands associated with the received signal.

In another aspect, an apparatus for improving amplitude estimation of a received signal is provided. The apparatus includes a processor configured to store TPC commands associated with a received signal. Additionally, the processor is configured to store an amplitude measurement for each slot associated with the received signal. Furthermore, the processor is configured to compute an estimate amplitude for the received signal based on a weighted average of the stored amplitude measurement for each slot associated with the received signal and based on the stored TPC commands associated with the received signal.

In another aspect, an apparatus for improving amplitude estimation of a received signal is provided that includes means for storing TPC commands associated with a received signal. Additionally, the apparatus includes means for storing an amplitude measurement for each slot associated with the received signal. Furthermore, the apparatus includes means for computing an estimate amplitude for the received signal based on a weighted average of the stored amplitude measurement for each slot associated with the received signal and based on the stored TPC commands associated with the received signal.

In yet another aspect, a computer-readable media for improving amplitude estimation of a received signal is provided that includes machine-executable code for storing TPC commands associated with a received signal. Additionally, the code may be executable for storing an amplitude measurement for each slot associated with the received signal. Furthermore, the code may be executable for computing an estimate amplitude for the received signal based on a weighted average of the stored amplitude measurement for each slot associated with the received signal and based on the stored TPC commands associated with the received signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents. Furthermore, in the subject disclosure, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Furthermore, in the subject disclosure, the word "exemplary" is used to mean serving as an example, instance or illustration. Any aspect or design herein as "exemplary" is not necessarily to be construed as preferred or advantageous over other aspects or designs. Rather, use of the word exemplary is intended to present concepts in a concrete fashion As discussed above, in CDMA systems, forward and reverse links periodically transmit dedicated pilot symbols every slot to estimate the channel. SNR estimation based on those dedicated pilots is used for power control to maintain the required link quality. However, since only a few dedicated pilots are utilized, power estimation based on the few dedicated pilots may be noisy and unreliable.

Indeed, exemplary aspects of this disclosure investigate estimation of SNR when used in fast power control. Since SNR is an important merit in the design, analysis and operation of receivers, proper estimation of SNR of signals received at a UE may help reduce utilization of available UE resources. To increase the channel capacity of a UE, aspects of this disclosure estimate the amplitude of a received signal based on dedicated pilots and TPC commands transmitted by the UE. Specifically, estimation of SNR combines previous pilot amplitude measurements and the present pilot amplitude measurement along with stored TPC commands to accurately estimate the maximum-likelihood estimate of the SNR for signals received at a UE.

Thus, aspects of this apparatus and method for improving amplitude estimation of a received signal based on dedicated pilots and TPC commands.

Figure 1:
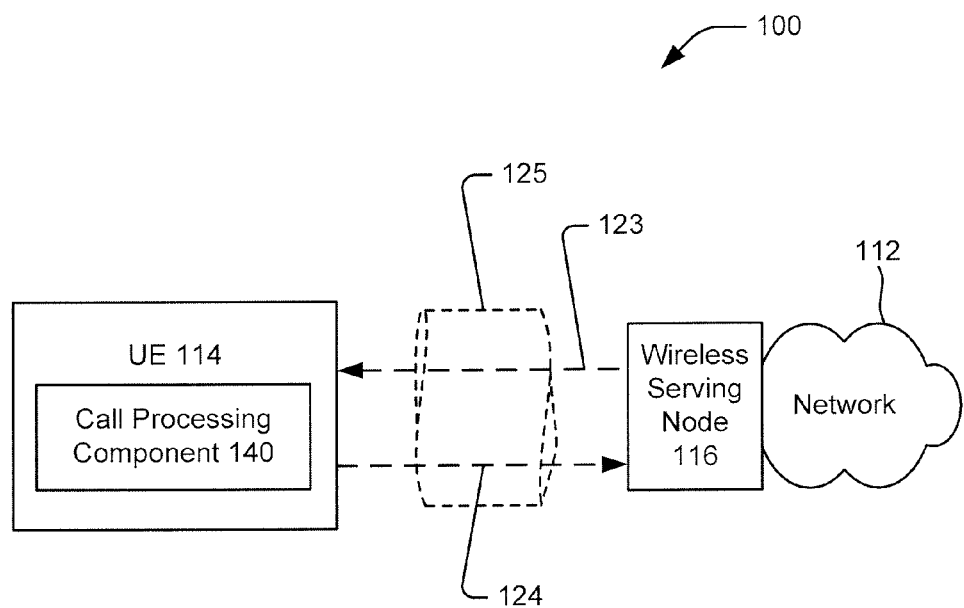
FIG. 1 is a schematic diagram illustrating an example aspect of call processing in a wireless communication system.

Referring to FIG. 1, in one aspect, a wireless communication system 100 is configured to facilitate transmitting data from a mobile device to a network. Wireless communication system 100 includes at least one UE 114 that may communicate wirelessly with one or more network 112 via serving nodes, including, but not limited to, wireless serving node 116 over one or more wireless link 125. The one or more wireless link 125, may include, but are not limited to, signaling radio bearers and/or data radio bearers. Wireless serving node 116 may be configured to transmit one or more signals 123 to UE 114 over the one or more wireless link 125, and/or UE 114 may transmit one or more signals 124 to wireless serving node 116. In an aspect, signal 123 and signal 124 may include, but are not limited to, one or more messages, such as transmitting a data from the UE 114 to the network via wireless serving node 116.

UE 114 may comprise a mobile apparatus and may be referred to as such throughout the present disclosure. Such a mobile apparatus or UE 114 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Additionally, the one or more wireless nodes, including, but not limited to, wireless serving node 116 of wireless communication system 100, may include one or more of any type of network component, such as an access point, including a base station or node B, a relay, a peer-to-peer device, an authentication, authorization and accounting (AAA) server, a mobile switching center (MSC), a radio network controller (RNC), etc. In a further aspect, the one or more wireless serving nodes of wireless communication system 100 may include one or more small base stations, such as, but not limited to a femtocell, picocell, microcell, or any other small base station.

Figure 2:
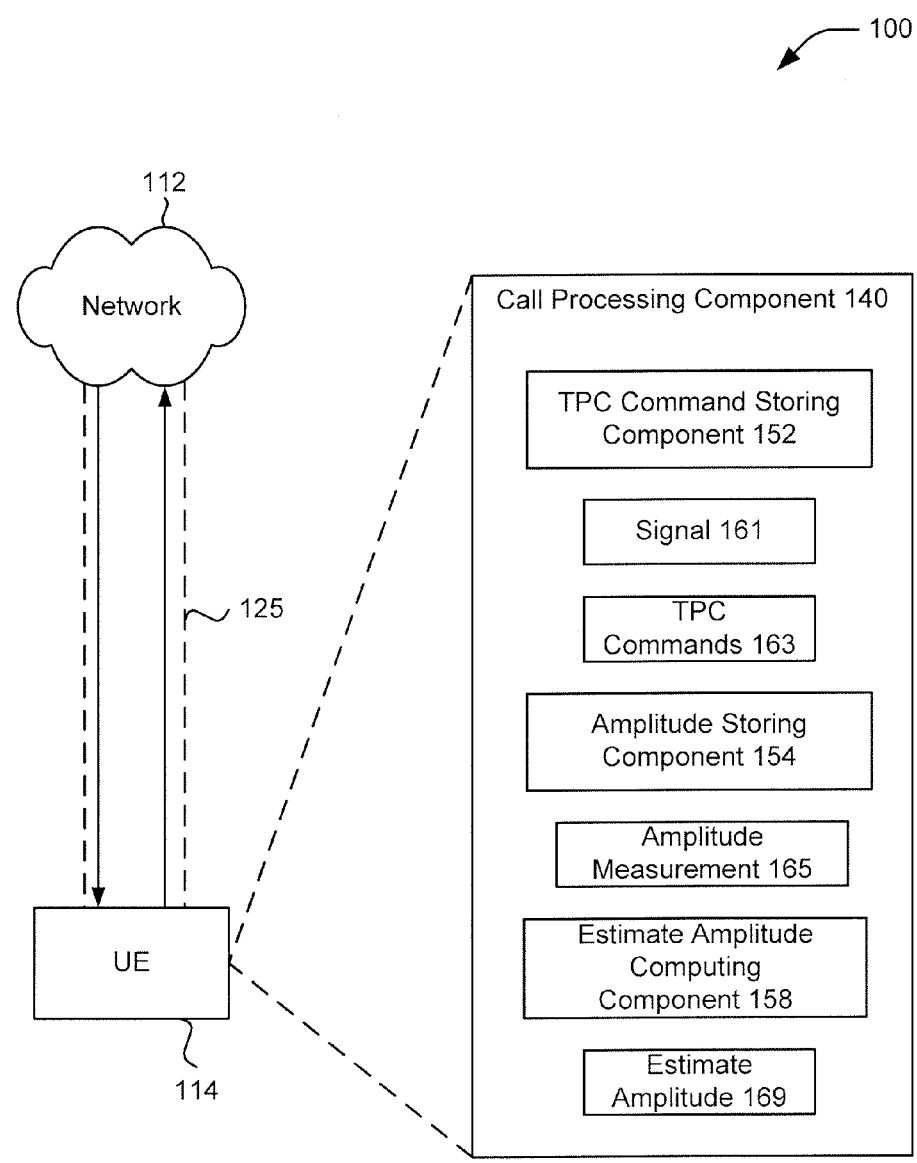
FIG. 2 is a schematic diagram illustrating another exemplary aspect of call processing in a wireless communication system.

Referring to FIG. 2, in an aspect of the present apparatus and method, a wireless communication system 100 is configured to include wireless communications between network 112 and UE 114. The wireless communications system may be configured to support communications between a number of users. FIG. 2 illustrates a manner in which network 112 communicates with UE 114 over wireless link 125. The wireless communication system 100 can be configured for downlink message transmission or uplink message transmission, as represented by the up/down arrows between network 112 and UE 114.

In an aspect, within the network 112 resides a call processing component 140. Call processing component 140 may be configured to increase channel capacity of UE 114 by properly estimating the amplitude of a received signal based on dedicated pilots and TPC commands of the received signal, thereby reducing the utilization of available UE 114 resources. Specifically, call processing component 140 combines previous pilot amplitude measurements and the present pilot amplitude measurement along with TPC commands to accurately estimate the maximum-likelihood estimate of the amplitude for signals received at UE 114.

Call processing component 140 may be configured, among other things, to include TPC command storing component 152 capable of storing TPC commands associated with a received signal. For example, TPC command storing component 152 of UE 114 is configured to store TPC commands 163 of signal 161 received from network 112 over wireless link 125.

It should be noted that TPC command storing component 152 also stores a history of TPC commands 163 associated with signal 161 in a bus memory.

In another aspect, call processing component 140 may also be configured to include amplitude storing component 154 capable of storing an amplitude measurement for each slot associated with the received signal. For example, include amplitude storing component 154 of UE 114 is configured for storing amplitude measurement 165 for each slot associated with received signal 161.

It should be noted that TPC command storing component 152 also stores a history of amplitude measurement 165 for each slot associated with signal 161 in a bus memory.

In yet another aspect, call processing component 140 may also be configured to include estimate amplitude computing component 158 capable of computing an estimate amplitude for the received signal based on a weighted average of the stored amplitude measurement for each slot associated with the received signal and based on the stored TPC commands associated with the received signal. For example, estimate amplitude computing component 158 of UE 114 is configured for computing estimate amplitude 169 for received signal 161 based on a weighted average of stored amplitude measurement 165 for each slot associated with received signal 161 and based on the stored TPC commands 163 associated with received signal 161.

After estimate amplitude computing component 158 generates estimate amplitude 169 according to a weighted average of the stored amplitude measurement 165 and the stored TPC commands 163, an estimated signal power of signal 161 may be calculated based on estimate amplitude 169. Additionally, a signal to interference ratio (SIR) may be calculated based on the estimated signal power of received signal 161.

It should also be noted that call processing component 140 may also be configured to detected TPC uplink errors and compensate for the TPC uplink errors by using $1/g_i$ in the equation for the weighted mean.

Figure 3:
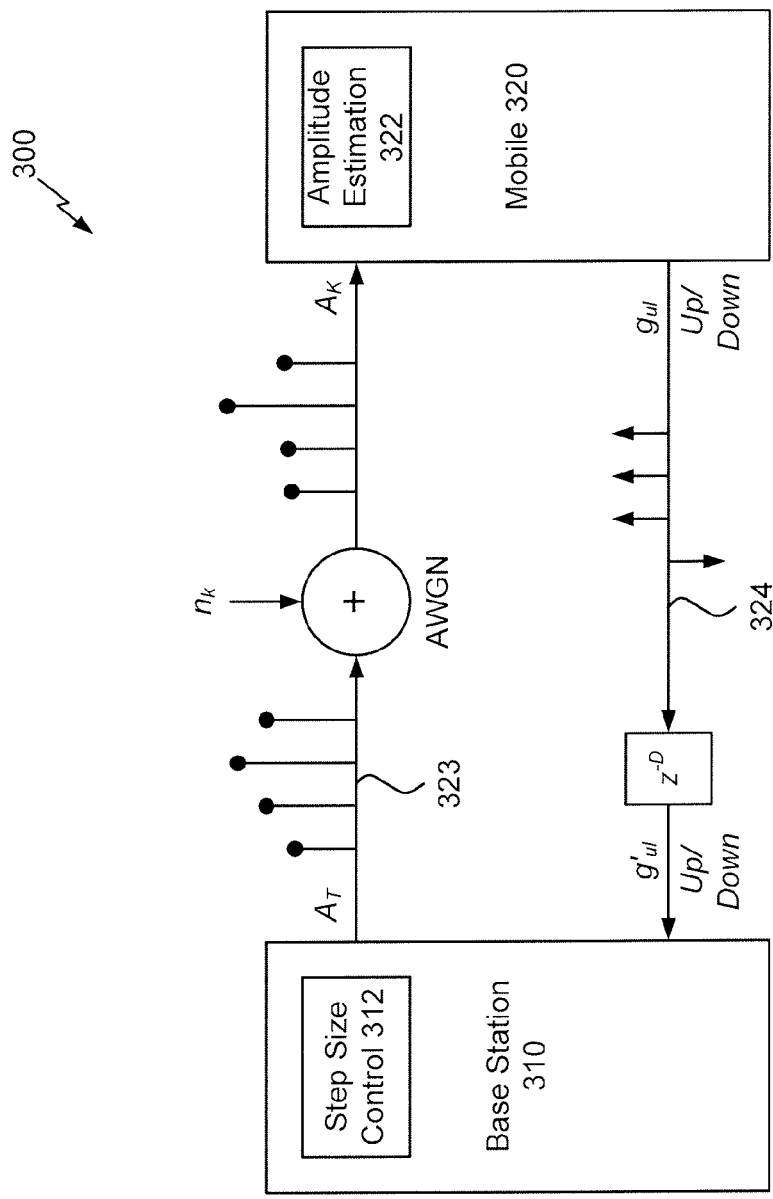
FIG. 3 is a schematic diagram illustrating a high level wireless communication system with feedback control.

FIG. 3 is a schematic diagram illustrating amplitude estimation of a received signal according to the call processing described in FIGS. 1 and 2. Within apparatus 300 of FIG. 3, there resides a base station 310 in communication with mobile 320 via wireless link 323 (similar to signal 123 of FIG. 1). Likewise, mobile 320 of apparatus 300 communicates with base station 310 via wireless link 324 (similar to signal 123 of FIG. 1). Base station 310 may be located in network 112 of FIG. 2 while mobile 320 may be configured to act as UE 114 of FIG. 2. As such, apparatus 300 may be configured to include, for example, wireless communication system 100 (FIGS. 1 and 2) and/or call processing component 140 (FIGS. 1 and 2) implementing the components described above, such as TPC command storing component 152, amplitude storing component 154, weighted average determining component 157, estimate amplitude computing component 158.

Specifically, FIG. 3 illustrates amplitude estimation 322 at mobile 320 (i.e., the generation of closed loop power control) based on stored TPC commands 163 and the stored amplitude measurement 165 for each slot associated with signal 161. For example, when a sequence of dedicated pilots with different amplitudes are transmitted from base station 310 to mobile 320 over wireless link 125, estimate amplitude 169 of signal 161 is estimated according to amplitude estimation 322, referred to as estimate amplitude computing component 158 in FIG. 2. Note, TPC commands 163 stored on the mobile 320 are "UP"/"DOWN" commands where the step size is ±1 (dB), or other step values as determined by step size control 312 (which estimates the nodeB power "UP"/"DOWN" steps).

For example, when amplitude for a first slot of signal 161 is $A_{TX}(t=1)=A$, the amplitude at the next slot of signal 161 may be $A_{TX}(t=2)=g_1 \cdot A$, where $g_1=1.12$ or $0.89$ according to perfect uplink feedback of TPC commands 163. In the same way, the transmitter amplitude for the $3^{rd}$ slot of signal 161 will be $A_{TX}(t=3)=g_2 \cdot g_1 \cdot A$. As such, the amplitude measurement for each slot of signal 161 is taken as the mean over $N_p$ dedicated pilots after the dot-product with the pilot pattern and with the common pilot channel (CPICH).

Indeed, at amplitude estimation 322, two consecutive amplitude measurements $A_1, A_2$ for two slots of a subframe transmitted on wireless link 323 (123) may be expressed as equations 1 and 2:

$$A_1 = A + n_1,$$

$$A_2 = g_1 \cdot A + n_2,$$

Where A is the transmitted amplitude, $g_1$ is the gain associated with the receiver TPC command at slot 1, and the sample $n_k$ is independent identically distributed (i.i.d.) zero-mean Gaussian random variables having variance of $\sigma_2$, and also independent of the transmitter amplitude.

Extending to more amplitude measurements at the receiver for multiple slots of a subframe transmitted on wireless link 323, amplitude measurements $A_1, A_2, A_3$ may be expressed as equations 1, 2, and 3:

$$A_1 = A + n_1,$$

$$A_2 = g_1 \cdot A + n_2,$$

$$A_3 = g_2 \cdot g_1 \cdot A | n_3,$$

Where $g_2, g_1$ are the gains associated with the receiver TPC commands.

In other words, given the observations $A_1, A_2 \ldots, A_N$ and TPC commands $g_1, g_2 \ldots, g_{N-1}$, amplitude estimation 322 (or estimate amplitude computing component 158 of FIG. 2) may then be able estimate signal amplitude $\hat{A}_N$ (or estimate amplitude 169 of FIG. 2) for signal 161.

Therefore, according to FIG. 3, in the case of N consecutive slots of signal 161 along with the last N−1 TPC commands 163, amplitude estimation 322 may be able to estimate the estimate amplitude 169 $\hat{A}_N$ for signal 161. It should be noted that N is the number of observations where N−1 are previous measurements that are stored in a memory buffer, and where the last observation is the measurement from the present slot.

Accordingly, assuming independence of the noise samples, and known amplitudes measurements along with known TPC commands, the joint probability density function of the amplitudes measurements from N consecutive slots of signal 161 along with the last N−1 TPC commands 163 can be expressed as:

$$\vec{A} = (A_1, A_2, \ldots, A_N)$$

$$\vec{g} = (g_1, g_2, \ldots, g_{N-1})$$

$$\hat{A} = \underset{A'}{\operatorname{argmax}} \left\{ P\left(\vec{A} \mid A', g_1 \ldots g_{N-1}\right) \right\}$$

$$\hat{A} = \underset{A'}{\operatorname{argmax}} \left\{ \ln\left[\prod_{n=1}^{N} P(A_n \mid A', g_1 \ldots g_{n-1})\right] \right\}$$

$$= \underset{A'}{\operatorname{argmax}} \left\{ \sum_{n=1}^{N} \ln[P(A_n \mid A', g_1 \ldots g_{n-1})] \right\}$$

$$= \underset{A'}{\operatorname{argmax}} \left\{ \sum_{n=1}^{N} \ln\left[ P\left(n_n = A_n - \left(\prod_{m=1}^{n-1} g_m\right) \cdot A'\right) \right] \right\}$$

$$= \underset{A'}{\operatorname{argmax}} \left\{ \sum_{n=1}^{N} \ln\left[ \frac{1}{\sqrt{2\pi}\,\sigma} e^{-\frac{(A_n - (\prod_{m=1}^{n-1} g_m) \cdot A')^2}{2\sigma^2}} \right] \right\}$$

$$= \underset{A'}{\operatorname{argmin}} \left\{ \sum_{n=1}^{N} \left( A_n - \left(\prod_{m=1}^{n-1} g_m\right) \cdot A' \right)^2 \right\}$$

After letting $$\frac{\partial}{\partial A'} = 0$$

and the maximum likelihood solution becomes:

$$\hat{A} = \frac{\sum_{n=1}^{N} \left[ \left(\prod_{m=1}^{n-1} g_m\right) \cdot A_n \right]}{\sum_{n=1}^{N} \left[ \left(\prod_{m=1}^{n-1} g_m\right)^2 \right]}$$

Extending this formula to a general time domain, the solution becomes:

$$\hat{A}_N = \left(\prod_{m=1}^{N-1} g_m\right) \cdot \frac{\sum_{n=1}^{N} \left[ \left(\prod_{m=1}^{n-1} g_m\right) \cdot A_n \right]}{\sum_{n=1}^{N} \left[ \left(\prod_{m=1}^{n-1} g_m\right)^2 \right]}$$

Therefore, according to the maximum likelihood rule on the amplitude, the maximum likelihood amplitude estimation for $\hat{A}_N$ expressed in vector form is:

$$\hat{A}_k = \left(\prod_{m=1}^{N-1} g_{k-N+m}\right) \cdot \frac{\vec{G} \cdot \vec{A}}{\vec{G} \cdot \vec{G}^T}$$

Where $$\vec{A} = [A_{k-N+1}, A_{k-N+2}, \ldots, A_{k-1}, A_k]$$

$$\vec{G} = \left[1, g_{k-N+1}, (g_{k-N+1} \cdot g_{k-N+2}), \ldots, \prod_{m=1}^{N-1} g_{k-N+m}\right].$$

It should be noted that the value of linear step size $g_m$, can be 1.12 corresponds to +1 [dB] ("UP") or 0.89 which correspond to −1 [dB] ("DOWN"), and therefore it follows that $$\frac{1}{0.89} = 1.12.$$

In general, other steps size are possible and this is also estimated by the UE.

So product expression like: $\prod_{m=1}^{n-1}$ can be expressed as $$\prod_{m=1}^{n-1} b^{qm}$$

Where $b^1 = 1.12$, $b^{-1} = 0.89$ and $q = \{-1, +1\}$.

Therefore, as:

$$\prod_{m=1}^{n-1} g_m = \prod_{m=1}^{n-1} b^{qm} = b^{\sum_{m}^{n-1} q_m}$$

The $\hat{A}_k$ may be expressed as:

$$\hat{A}_k = \left(b^{\sum_{m=1}^{N-1} q_{k-N+m}}\right) \cdot \frac{\sum_{n=1}^{N} \left[\left(b^{\sum_{m=1}^{n-1} q_{k-N+m}}\right) \cdot A_{k-N+n}\right]}{\sum_{n=1}^{N} \left[\left(b^{2\sum_{m=1}^{n-1} q_{k-N+m}}\right)\right]}$$

Thereafter, the estimated mean amplitude $\mu_{\hat{A}}$ may be expressed as:

$$\mu_{\hat{A}} = E[\hat{A}] = \frac{\sum_{n=1}^{N} \left[\left(\prod_{m=1}^{n-1} g_m\right)\left(\prod_{m=1}^{n-1} g_m\right)\right]}{\sum_{n=1}^{N} \left[\left(\prod_{m=1}^{n-1} g_m\right)^2\right]} \cdot A = A$$

The above maximum likelihood amplitude calculation is adapted to achieve the Cramér-Rao bound for amplitude estimation. The Cramér-Rao bound expresses a lower bound on the variance of estimators of a deterministic parameter. In its simplest form, the bound states that the variance of any unbiased estimator is at least as high as the inverse of the Fisher information. An unbiased estimator which achieves this lower bound is said to be fully efficient. Such a solution achieves the lowest possible mean squared error among all unbiased methods, and is therefore the minimum variance unbiased (MVU) estimator.

Figure 4:
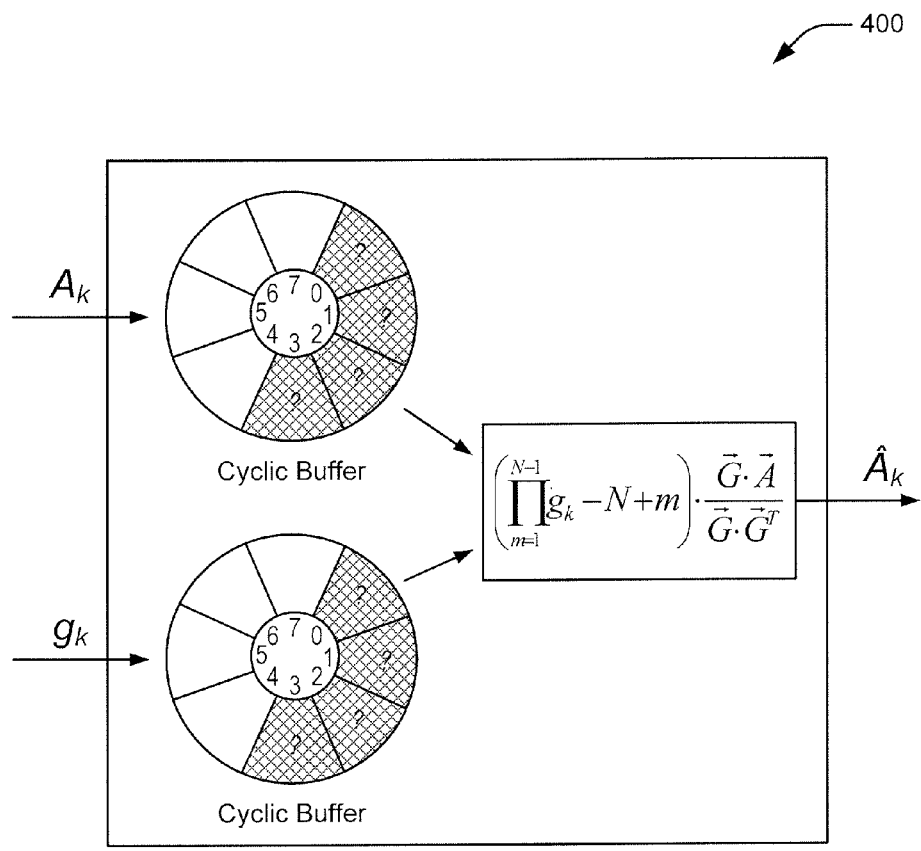
FIG. 4 is another schematic diagram illustrating two cyclic buffers and a processing unit for estimation of amplitude

FIG. 4 is a schematic diagram 400 illustrating amplitude estimation of a received signal. Specifically, FIG. 4 illustrates the estimator architecture for TPC Weighted Multi-Slot Averaging (T-WMSA) for amplitude estimation 322 of FIG. 3. Inputs $A_k$ and $g_k$ are the present estimate amplitude 169 measurements for signal 161 and TPC commands 163, respectively. Output $Â_k$ output from amplitude estimation 322 is estimate amplitude 169, as referenced and described in FIG. 2. Basically, FIG. 4 is a high level block diagram of amplitude estimation 322 that consists of 2 cyclic buffers of size N−1 elements which stores the amplitude measurement 165 and TPC commands 163 of signal 161.

Figure 5:
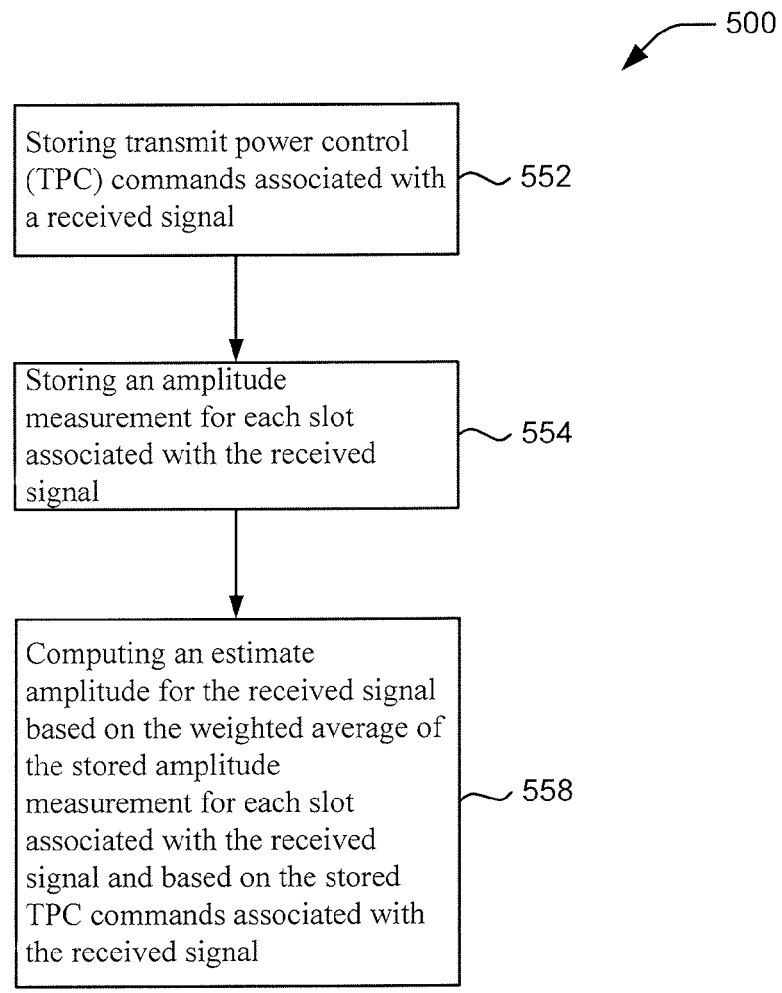
FIG. 5 is a flow diagram illustrating the exemplary method for call processing in a wireless communication system.

FIG. 5 is a flow diagram illustrating an exemplary method 500 described the process of call processing from the network perspective. At 552, method 500 includes storing TPC commands associated with a received signal. For example, as discussed above with reference to FIG. 2, TPC command storing component 152 of UE 114 is configured to store TPC commands 163 of signal 161 received from network 112 over wireless link 125.

At 554, method 500 includes storing an amplitude measurement for each slot associated with the received signal. For example, after TPC command storing component 152 stores TPC commands 163 of signal 161 received from network 112, amplitude storing component 154 of UE 114 is configured for storing amplitude measurement 165 for each slot associated with received signal 161.

Computing an estimate amplitude for the received signal based on the weighted average of the stored amplitude measurement for each slot associated with the received signal and based on the stored TPC commands associated with the received signal occurs at 558. For example, after amplitude storing component 154 of UE 114 stores amplitude measurement 165 for each slot associated with received signal 161, estimate amplitude computing component 158 of UE 114 is configured for computing estimate amplitude 169 for received signal 161 based on the weighted average of stored amplitude measurement 165 for each slot associated with received signal 161 and based on the stored TPC commands 163 associated with received signal 161.

In an aspect, for example, the executing method 500 may be UE 114 or network 112 (FIGS. 1 and 2) executing the call processing component 140 (FIGS. 1 and 2), or respective components thereof.

Figure 6:
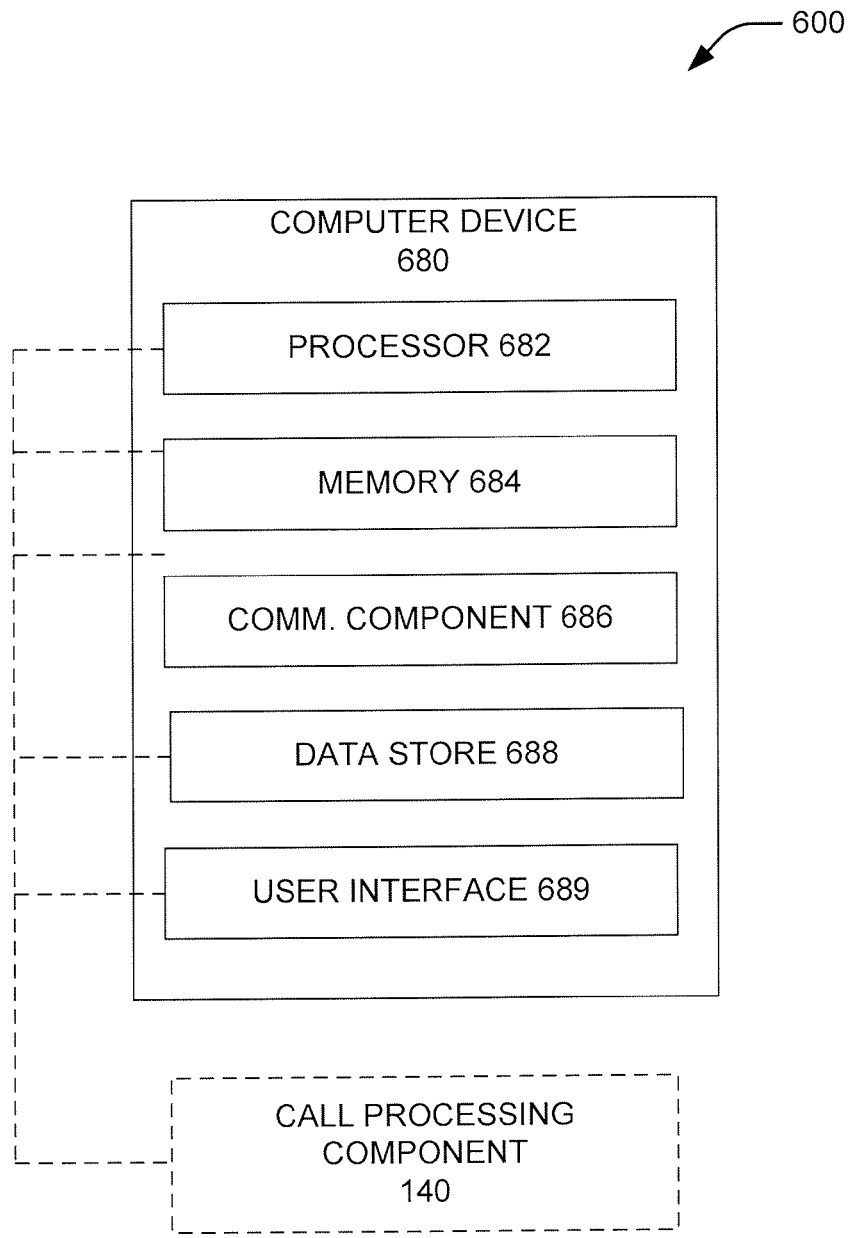
FIG. 6 is a block diagram illustrating additional example components of an aspect of a computer device having a call processing component according to the present disclosure.

Referring to the computer system 600 of FIG. 6, in one aspect. UE 114 and/or wireless serving node 116 of FIGS. 1 and 2 may be represented by a specially programmed or configured computer device 680, wherein the special programming or configuration includes call processing component 140, as described herein. For example, for implementation as UE 114 (FIGS. 1 and 2), computer device 680 may include one or more components for computing and transmitting a data from a UE 114 to network 112 via wireless serving node 116, such as in specially programmed computer readable instructions or code, firmware, hardware, or some combination thereof. Computer device 680 includes a processor 682 for carrying out processing functions associated with one or more of components and functions described herein. Processor 682 can include a single or multiple set of processors or multi-core processors. Moreover, processor 682 can be implemented as an integrated processing system and/or a distributed processing system.

Computer device 680 further includes a memory 684, such as for storing data used herein and/or local versions of applications being executed by processor 682. Memory 684 can include any type of memory usable by a computer, such as random access memory (RAM), read only memory (ROM), tapes, magnetic discs, optical discs, volatile memory, non-volatile memory, and any combination thereof.

Further, computer device 680 includes a communications component 686 that provides for establishing and maintaining communications with one or more parties utilizing hardware, software, and services as described herein. Communications component 686 may carry communications between components on computer device 680, as well as between computer device 680 and external devices, such as devices located across a communications network and/or devices serially or locally connected to computer device 680. For example, communications component 686 may include one or more buses, and may further include transmit chain components and receive chain components associated with a transmitter and receiver, respectively, or a transceiver, operable for interfacing with external devices. For example, in an aspect, a receiver of communications component 686 operates to receive one or more data via a wireless serving node 116, which may be a part of memory 684.

Additionally, computer device 680 may further include a data store 688, which can be any suitable combination of hardware and/or software, that provides for mass storage of information, databases, and programs employed in connection with aspects described herein. For example, data store 688 may be a data repository for applications not currently being executed by processor 682.

Computer device 680 may additionally include a user interface component 689 operable to receive inputs from a user of computer device 680, and further operable to generate outputs for presentation to the user. User interface component 689 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 689 may include one or more output devices, including but not limited to a display, a speaker, a haptic feedback mechanism, a printer, any other mechanism capable of presenting an output to a user, or any combination thereof.

Furthermore, computer device 680 may include, or may be in communication with, call processing component 140, which may be configured to perform the functions described herein.

Figure 7:
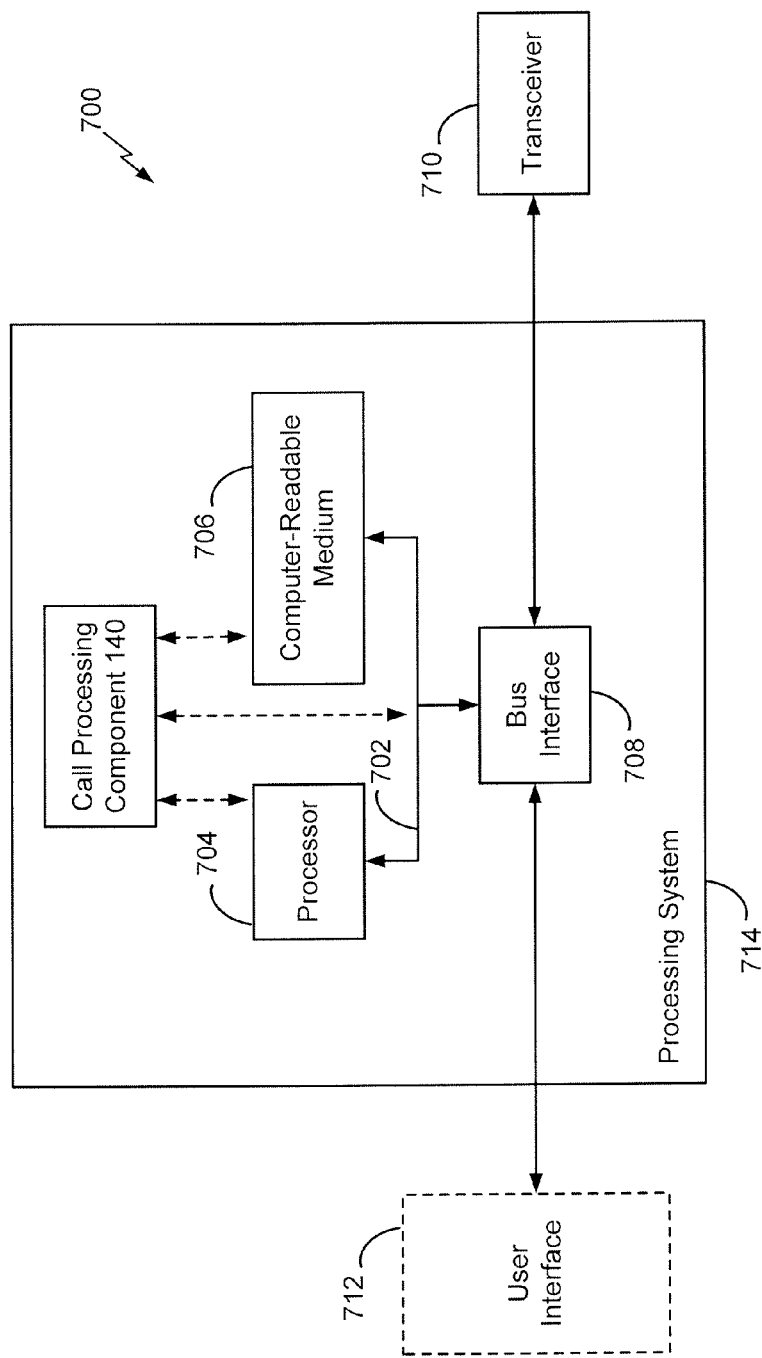
FIG. 7 is a block diagram illustrating an example of a hardware implementation for an apparatus employing a processing system to perform the functions described herein.

FIG. 7 is a block diagram illustrating an example of a hardware implementation for an apparatus 700 employing a processing system 714. Apparatus 700 may be configured to include, for example, the call processing component 140 (FIGS. 1 and 2) implementing the components described above, such as TPC command storing component 152, amplitude storing component 154, estimate amplitude computing component 158. The bus 702 may include any number of interconnecting buses and bridges depending on the specific application of the processing system 714 and the overall design constraints. The bus 702 links together various circuits including one or more processors, represented generally by the processor 704, and computer-readable media, represented generally by the computer-readable medium 706. The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a means for communicating with various other apparatus over a transmission medium.

Depending upon the nature of the apparatus, a user interface 712 (e.g., keypad, display, speaker, microphone, joystick) may also be provided.

The processor 704 is responsible for managing the bus 702 and general processing, including the execution of software stored on the computer-readable medium 706. The software, when executed by the processor 704, causes the processing system 714 to perform the various functions described infra for any particular apparatus. The computer-readable medium 706 may also be used for storing data that is manipulated by the processor 704 when executing software.

In an aspect, processor 704, computer-readable medium 706, or a combination of both may be configured or otherwise specially programmed to perform the functionality of the call processing component 140 (FIGS. 1 and 2) as described herein.

The various concepts presented throughout this disclosure may be implemented across a broad variety of telecommunication systems, network architectures, and communication standards.

Figure 8:
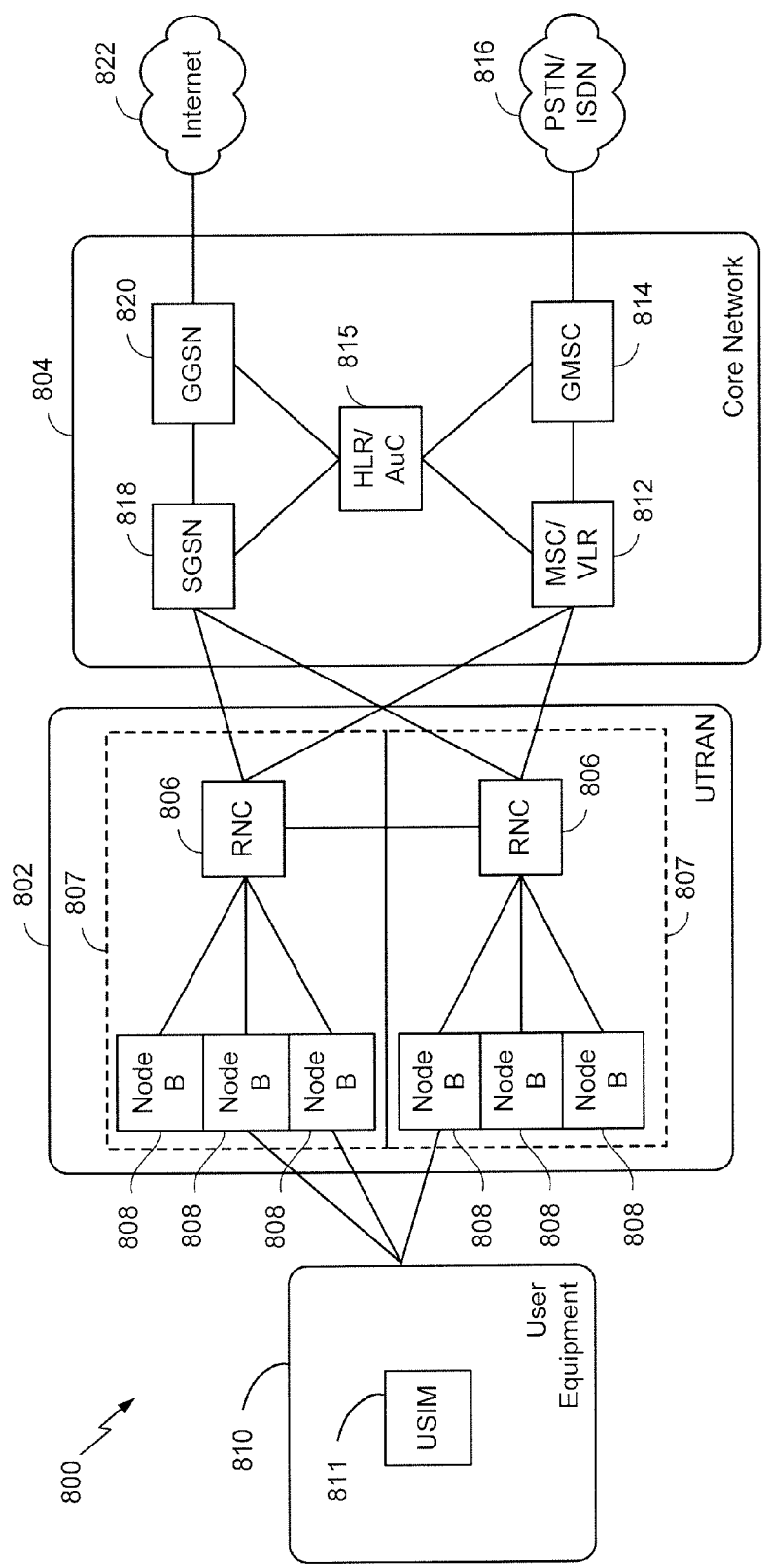
FIG. 8 is a block diagram conceptually illustrating an example of a telecommunications system including a UE configured to perform the functions described herein.

Referring to FIG. 8, by way of example and without limitation, the aspects of the present disclosure are presented with reference to a UMTS system 800 employing a W-CDMA air interface. A UMTS network includes three interacting domains: a Core Network (CN) 804, a UMTS Terrestrial Radio Access Network (UTRAN) 802, and User Equipment (UE) 810. UE 810 may be configured to include, for example, the call processing component 140 (FIGS. 1 and 2) implementing the components described above, such as TPC command storing component 152, amplitude storing component 154, estimate amplitude computing component 158. In this example, the UTRAN 802 provides various wireless services including telephony, video, data, messaging, broadcasts, and/or other services. The UTRAN 802 may include a plurality of Radio Network Subsystems (RNSs) such as an RNS 807, each controlled by a respective Radio Network Controller (RNC) such as an RNC 806. Here, the UTRAN 802 may include any number of RNCs 806 and RNSs 807 in addition to the RNCs 806 and RNSs 807 illustrated herein. The RNC 806 is an apparatus responsible for, among other things, assigning, reconfiguring and releasing radio resources within the RNS 806. The RNC 806 may be interconnected to other RNCs (not shown) in the UTRAN 802 through various types of interfaces such as a direct physical connection, a virtual network, or the like, using any suitable transport network.

Communication between a UE 810 and a Node B 808 may be considered as including a physical (PHY) layer and a medium access control (MAC) layer. Further, communication between a UE 810 and an RNC 806 by way of a respective Node B 808 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 24.331, incorporated herein by reference.

The geographic region covered by the RNS 807 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 808 are shown in each RNS 807; however, the RNSs 807 may include any number of wireless Node Bs. The Node Bs 808 provide wireless access points to a CN 804 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The UE 810 is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 810 may further include a universal subscriber identity module (USIM) 811, which contains a user's subscription information to a network. For illustrative purposes, one UE 810 is shown in communication with a number of the Node Bs 808. The DL, also called the forward link, refers to the communication link from a Node B 808 to a UE 810, and the UL, also called the reverse link, refers to the communication link from a UE 810 to a Node B 808.

The CN 804 interfaces with one or more access networks, such as the UTRAN 802. As shown, the CN 804 is a GSM core network. However, as those skilled in the art will recognize, the various concepts presented throughout this disclosure may be implemented in a RAN, or other suitable access network, to provide UEs with access to types of CNs other than GSM networks.

The CN 804 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 804 supports circuit-switched services with a MSC 812 and a GMSC 814. In some applications, the GMSC 814 may be referred to as a media gateway (MGW). One or more RNCs, such as the RNC 806, may be connected to the MSC 812. The MSC 812 is an apparatus that controls call setup, call routing, and UE mobility functions. The MSC 812 also includes a VLR that contains subscriber-related information for the duration that a UE is in the coverage area of the MSC 812. The GMSC 814 provides a gateway through the MSC 812 for the UE to access a circuit-switched network 816. The GMSC 814 includes a home location register (HLR) 814 containing subscriber data, such as the data reflecting the details of the services to which a particular user has subscribed. The HLR is also associated with an authentication center (AuC) that contains subscriber-specific authentication data. When a call is received for a particular UE, the GMSC 814 queries the HLR 814 to determine the UE's location and forwards the call to the particular MSC serving that location.

The CN 804 also supports packet-data services with a serving GPRS support node (SGSN) 818 and a gateway GPRS support node (GGSN) 820. GPRS, which stands for General Packet Radio Service, is designed to provide packet-data services at speeds higher than those available with standard circuit-switched data services. The GGSN 820 provides a connection for the UTRAN 802 to a packet-based network 822. The packet-based network 822 may be the Internet, a private data network, or some other suitable packet-based network. The primary function of the GGSN 820 is to provide the UEs 810 with packet-based network connectivity. Data packets may be transferred between the GGSN 820 and the UEs 810 through the SGSN 818, which performs primarily the same functions in the packet-based domain as the MSC 812 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 808 and a UE 810. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 810 provides feedback to the node B 808 over the HS-DPCCH to indicate whether it correctly decoded a packet on the downlink.

HS-DPCCH further includes feedback signaling from the UE 810 to assist the node B 808 in taking the right decision in terms of modulation and coding scheme and precoding weight selection, this feedback signaling including the CQI and PCI.

"HSPA Evolved" or HSPA+ is an evolution of the HSPA standard that includes MIMO and 84-QAM, enabling increased throughput and higher performance. That is, in an aspect of the disclosure, the node B 808 and/or the UE 810 may have multiple antennas supporting MIMO technology. The use of MIMO technology enables the node B 808 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 810 to increase the data rate, or to multiple UEs 810 to increase the overall system capacity. This is achieved by spatially precoding each data stream and then transmitting each spatially precoded stream through a different transmit antenna on the downlink. The spatially precoded data streams arrive at the UE(s) 810 with different spatial signatures, which enables each of the UE(s) 810 to recover the one or more the data streams destined for that UE 810. On the uplink, each UE 810 may transmit one or more spatially precoded data streams, which enables the node B 808 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 9:
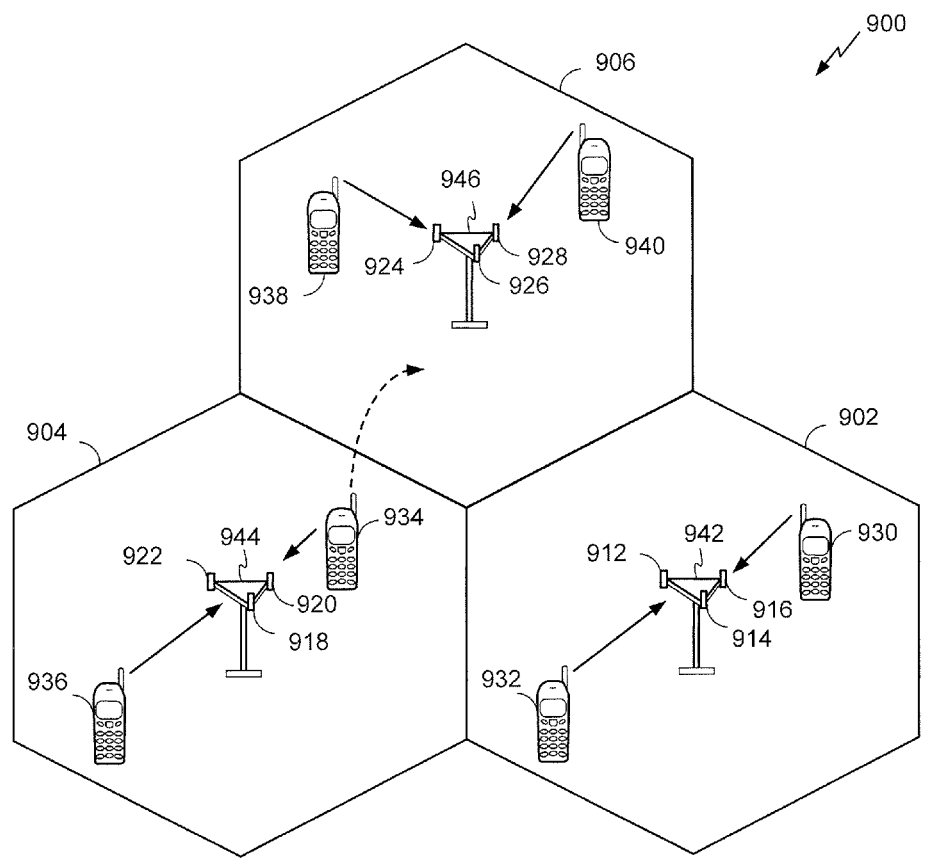
FIG. 9 is a conceptual diagram illustrating an example of an access network for use with a UE configured to perform the functions described herein.

Referring to FIG. 9, an access network 900 in a UTRAN architecture is illustrated. The multiple access wireless communication system includes multiple cellular regions (cells), including cells 902, 904, and 906, each of which may include one or more sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 each correspond to a different sector. In cell 906, antenna groups 924, 926, and 928 each correspond to a different sector. The cells 902, 904 and 906 may include several wireless communication devices, e.g., User Equipment or UEs, which may be in communication with one or more sectors of each cell 902, 904 or 906. For example, UEs 930 and 932 may be in communication with Node B 942, UEs 934 and 936 may be in communication with Node B 944, and UEs 938 and 940 can be in communication with Node B 946. Here, each Node B 942, 944, 946 is configured to provide an access point to a CN 804 (see FIG. 8) for all the UEs 930, 932, 934, 936, 938, 940 in the respective cells 902, 904, and 906. Node Bs 942, 944, 946 and UEs 930, 932, 934, 936, 938, 940 respectively may be configured to include, for example, the call processing component 140 (FIGS. 1 and 2) implementing the components described above, such as TPC command storing component 152, amplitude storing component 154, estimate amplitude computing component 159.

As the UE 934 moves from the illustrated location in cell 904 into cell 906, a serving cell change (SCC) or handover may occur in which communication with the UE 934 transitions from the cell 904, which may be referred to as the source cell, to cell 906, which may be referred to as the target cell. Management of the handover procedure may take place at the UE 934, at the Node Bs corresponding to the respective cells, at a radio network controller 706 (see FIG. 7), or at another suitable node in the wireless network. For example, during a call with the source cell 904, or at any other time, the UE 934 may monitor various parameters of the source cell 904 as well as various parameters of neighboring cells such as cells 906 and 902. Further, depending on the quality of these parameters, the UE 934 may maintain communication with one or more of the neighboring cells. During this time, the UE 934 may maintain an Active Set, that is, a list of cells that the UE 934 is simultaneously connected to (i.e., the UTRA cells that are currently assigning a downlink dedicated physical channel DPCH or fractional downlink dedicated physical channel F-DPCH to the UE 934 may constitute the Active Set).

The modulation and multiple access scheme employed by the access network 900 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), and Flash-OFDM employing OFDMA. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 10.

Figure 10:
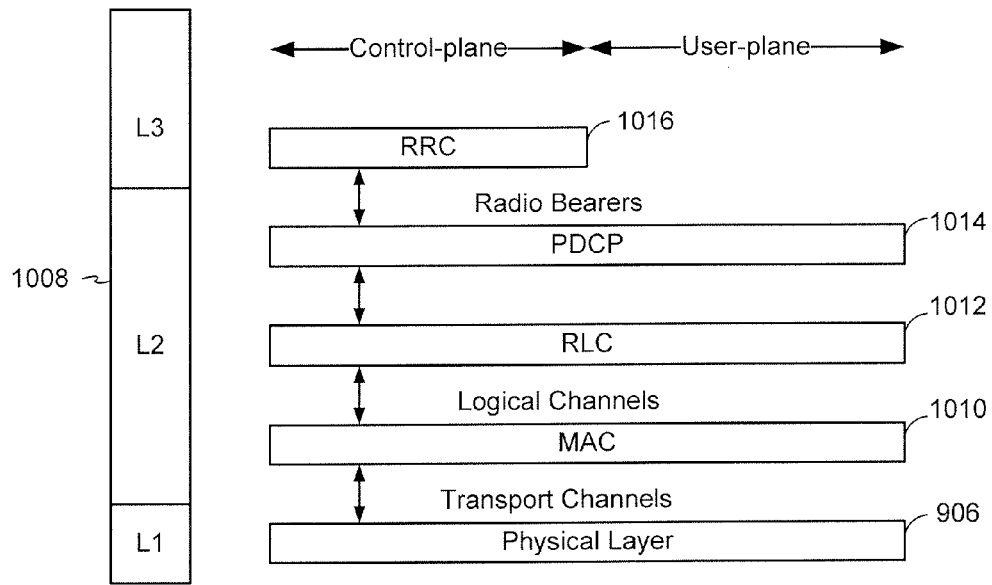
FIG. 10 is a conceptual diagram illustrating an example of a radio protocol architecture for the user and control planes for a base station and/or a UE configured to perform the functions described herein.

FIG. 10 is a conceptual diagram illustrating an example of the radio protocol architecture 1000 for the user plane and the control plane of a user equipment (UE) or node B/base station. For example, architecture 1000 may be included in a network entity and/or UE such as an entity within network 112 and/or UE 114 (FIGS. 1 and 2). The radio protocol architecture 1000 for the UE and node B is shown with three layers 1008: Layer 1, Layer 2, and Layer 3. Layer 1 is the lowest lower and implements various physical layer signal processing functions. As such, Layer 1 includes the physical layer 1006. Layer 2 (L2 layer) is above the physical layer 1006 and is responsible for the link between the UE and node B over the physical layer 1006. Layer 3 (L3 layer) includes a radio resource control (RRC) sublayer 1016. The RRC sublayer 1016 handles the control plane signaling of Layer 3 between the UE and the UTRAN.

In the user plane, the L2 layer includes a media access control (MAC) sublayer 1010, a radio link control (RLC) sublayer 1012, and a packet data convergence protocol (PDCP) 1014 sublayer, which are terminated at the node B on the network side. Although not shown, the UE may have several upper layers above the L2 layer including a network layer (e.g., IP layer) that is terminated at a PDN gateway on the network side, and an application layer that is terminated at the other end of the connection (e.g., far end UE, server, etc.).

The PDCP sublayer 1014 provides multiplexing between different radio bearers and logical channels. The PDCP sublayer 1014 also provides header compression for upper layer data packets to reduce radio transmission overhead, security by ciphering the data packets, and handover support for UEs between node Bs. The RLC sublayer 1012 provides segmentation and reassembly of upper layer data packets, retransmission of lost data packets, and reordering of data packets to compensate for out-of-order reception due to hybrid automatic repeat request (HARQ). The MAC sublayer 1010 provides multiplexing between logical and transport channels. The MAC sublayer 1010 is also responsible for allocating the various radio resources (e.g., resource blocks) in one cell among the UEs. The MAC sublayer 1010 is also responsible for HARQ operations.

Figure 11:
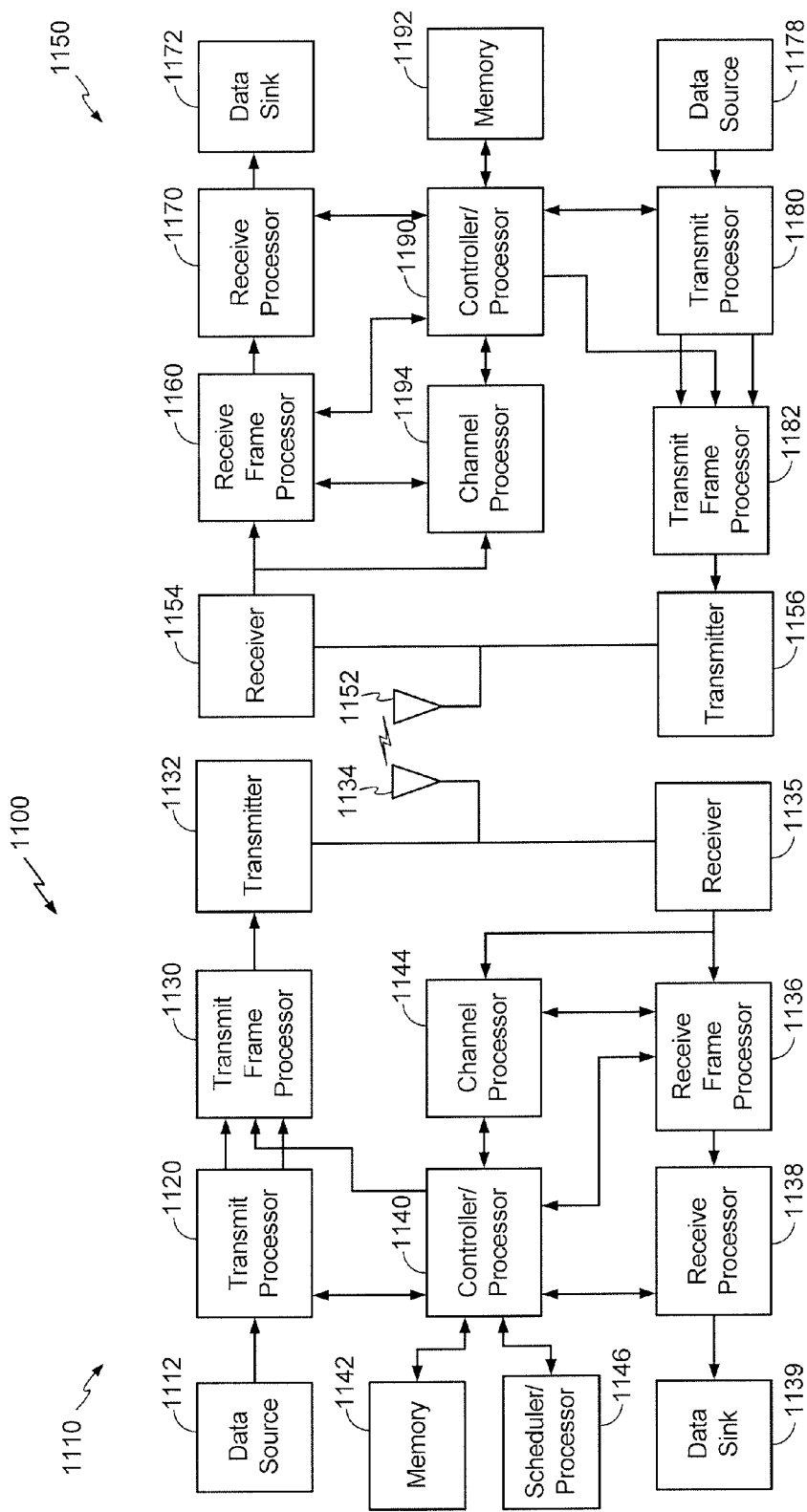
FIG. 11 is a block diagram conceptually illustrating an example of a Node B in communication with a UE in a telecommunications system configured to perform the functions described herein.

FIG. 11 is a block diagram of a communication system 1100 including a Node B 1110 in communication with a UE 1140, where Node B 1110 may be an entity within network 112 and the UE 1140 may be UE 114 according to the aspect described in FIGS. 1 and 2. In the downlink communication, a transmit processor 1120 may receive data from a data source 1116 and control signals from a controller/processor 1140. The transmit processor 1120 provides various signal processing functions for the data and control signals, as well as reference signals (e.g., pilot signals). For example, the transmit processor 1120 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1144 may be used by a controller/processor 1140 to determine the coding, modulation, spreading, and/or scrambling schemes for the transmit processor 1120. These channel estimates may be derived from a reference signal transmitted by the UE 1140 or from feedback from the UE 1140. The symbols generated by the transmit processor 1120 are provided to a transmit frame processor 1130 to create a frame structure. The transmit frame processor 1130 creates this frame structure by multiplexing the symbols with information from the controller/processor 1140, resulting in a series of frames. The frames are then provided to a transmitter 1132, which provides various signal conditioning functions including amplifying, filtering, and modulating the frames onto a carrier for downlink transmission over the wireless medium through antenna 1134. The antenna 1134 may include one or more antennas, for example, including beam steering bidirectional adaptive antenna arrays or other similar beam technologies.

At the UE 1140, a receiver 1144 receives the downlink transmission through an antenna 1142 and processes the transmission to recover the information modulated onto the carrier. The information recovered by the receiver 1144 is provided to a receive frame processor 1160, which parses each frame, and provides information from the frames to a channel processor 1194 and the data, control, and reference signals to a receive processor 1170. The receive processor 1170 then performs the inverse of the processing performed by the transmit processor 1120 in the Node B 1110. More specifically, the receive processor 1170 descrambles and despreads the symbols, and then determines the most likely signal constellation points transmitted by the Node B 1110 based on the modulation scheme. These soft decisions may be based on channel estimates computed by the channel processor 1194. The soft decisions are then decoded and deinterleaved to recover the data, control, and reference signals. The CRC codes are then checked to determine whether the frames were successfully decoded. The data carried by the successfully decoded frames will then be provided to a data sink 1172, which represents applications running in the UE 1140 and/or various user interfaces (e.g., display). Control signals carried by successfully decoded frames will be provided to a controller/processor 1190. When frames are unsuccessfully decoded by the receiver processor 1170, the controller/processor 1190 may also use an acknowledgement (ACK) and/or negative acknowledgement (NACK) protocol to support retransmission requests for those frames.

In the uplink, data from a data source 1178 and control signals from the controller/processor 1190 are provided to a transmit processor 1180. The data source 1178 may represent applications running in the UE 1140 and various user interfaces (e.g., keyboard). Similar to the functionality described in connection with the downlink transmission by the Node B 1110, the transmit processor 1180 provides various signal processing functions including CRC codes, coding and interleaving to facilitate FEC, mapping to signal constellations, spreading with OVSFs, and scrambling to produce a series of symbols. Channel estimates, derived by the channel processor 1194 from a reference signal transmitted by the Node B 1110 or from feedback contained in the midamble transmitted by the Node B 1110, may be used to select the appropriate coding, modulation, spreading, and/or scrambling schemes. The symbols produced by the transmit processor 1180 will be provided to a transmit frame processor 1182 to create a frame structure. The transmit frame processor 1182 creates this frame structure by multiplexing the symbols with information from the controller/processor 1190, resulting in a series of frames. The frames are then provided to a transmitter 1146, which provides various signal conditioning functions including amplification, filtering, and modulating the frames onto a carrier for uplink transmission over the wireless medium through the antenna 1142.

The uplink transmission is processed at the Node B 1110 in a manner similar to that described in connection with the receiver function at the UE 1140. A receiver 1134 receives the uplink transmission through the antenna 1134 and processes the transmission to recover the information modulated onto the carrier. The information recovered by the receiver 1134 is provided to a receive frame processor 1136, which parses each frame, and provides information from the frames to the channel processor 1144 and the data, control, and reference signals to a receive processor 1138. The receive processor 1138 performs the inverse of the processing performed by the transmit processor 1180 in the UE 1140. The data and control signals carried by the successfully decoded frames may then be provided to a data sink 1139 and the controller/processor, respectively. If some of the frames were unsuccessfully decoded by the receive processor, the controller/processor 1140 may also use an acknowledgement (ACK) and/or negative acknowledgement (NACK) protocol to support retransmission requests for those frames.

The controller/processors 1140 and 1190 may be used to direct the operation at the Node B 1110 and the UE 1140, respectively. For example, the controller/processors 1140 and 1190 may provide various functions including timing, peripheral interfaces, voltage regulation, power management, and other control functions. The computer readable media of memories 1142 and 1192 may store data and software for the Node B 1110 and the UE 1140, respectively. A scheduler/processor 1146 at the Node B 1110 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.10 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" or processor (FIG. 6 or 7) that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 706 (FIG. 7). The computer-readable medium 706 (FIG. 7) may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 34 U.S.C. §112, sixth paragraph, unless the element is expressly recited using the phrase "means for" or, in the case of a method claim, the element is recited using the phrase "step for."

What is claimed is:

1. A method of wireless communication, comprising:
   storing transmit power control (TPC) commands associated with at least two previous slots of a received signal, the TPC commands being transmitted in response to the received signal in each of the at least previous two slots;
   storing an amplitude measurement for each slot associated with the received signal; and
   computing an estimate amplitude for a current slot of the received signal based on a weighted average of the stored amplitude measurement for each of the at least two previous slots associated with the received signal, the stored amplitude measurements being weighted based on the stored TPC commands associated with the received signal.

2. The method of claim 1, further comprising storing a history of the TPC commands in a bus memory.

3. The method of claim 1, further comprising storing a history of amplitude measurement for each slot in a bus memory.

4. The method of claim 1, further comprising calculating an estimated signal power of the received signal based on the estimate amplitude.

5. The method of claim 4, further comprising computing a signal to interference ratio (SIR) based on the estimated signal power of the signal.

6. The method of claim 1, further comprising detecting TPC command uplink errors.

7. The method of claim 6, further comprising compensating for the detected TPC command uplink errors.

8. The method of claim 1, further comprising storing the TPC commands as "UP"/"DOWN" commands.

9. The method of claim 1, further comprising estimating a nodeB power "UP"/"DOWN" steps.

10. The method of claim 1, further comprising determining a joint probability density function of the stored amplitude measurement for each slot and the stored TPC commands, wherein the estimate amplitude is based on a maximum likelihood solution to the joint probability density function.

11. An apparatus of wireless communication, comprising:
    at least one processor; and
    a memory coupled to the at least one processor, wherein the at least one processor is configured to:
    store transmit power control (TPC) commands associated with at least previous two slots of a received signal, the TPC commands being transmitted in response to the received signal in each of the at least previous two slots;
    store an amplitude measurement for each slot associated with the received signal; and
    compute an estimate amplitude for a current slot of the received signal based on a weighted average of the stored amplitude measurement for each of the at least two previous slots associated with the received signal, the stored amplitude measurements being weighted based on the stored TPC commands associated with the received signal.

12. The apparatus of claim 11, wherein the at least one processor is further configured to store a history of the TPC commands in a bus memory.

13. The apparatus of claim 11, wherein the at least one processor is further configured to store a history of amplitude measurement for each slot in a bus memory.

14. The apparatus of claim 11, wherein the at least one processor is further configured to calculate an estimated signal power of the received signal based on the estimate amplitude.

15. The apparatus of claim 14, wherein the at least one processor is further configured to compute a signal to interference ratio (SIR) based on the estimated signal power of the signal.

16. The apparatus of claim 11, wherein the at least one processor is further configured to detect TPC command uplink errors.

17. The apparatus of claim 16, wherein the at least one processor is further configured to compensate for the detected TPC command uplink errors.

18. The apparatus of claim 11, wherein the at least one processor is further configured to store the TPC commands as "UP"/"DOWN" commands.

19. The apparatus of claim 11, wherein the at least one processor is further configured to estimate a nodeB power "UP"/"DOWN" steps.

20. The apparatus of claim 11, wherein the at least one processor is further configured to determine a joint probability density function of the stored amplitude measurement for each slot and the stored TPC commands, wherein the estimate amplitude is based on a maximum likelihood solution to the joint probability density function.

21. An apparatus of wireless communication, comprising:
    means for storing transmit power control (TPC) commands associated with at least two previous slots of a received signal, the TPC commands being transmitted in response to the received signal in each of the at least previous two slots;
    means for storing an amplitude measurement for each slot associated with the received signal; and
    means for computing an estimate amplitude for a current slot of the received signal based on a weighted average of the stored amplitude measurement for each of the at least two previous slots associated with the received signal, the stored amplitude measurements being weighted based on the stored TPC commands associated with the received signal.

22. A non-transitory computer readable medium storing computer executable code, comprising code for:
- storing transmit power control (TPC) commands associated with at least two slots of a received signal, the TPC commands being transmitted in response to the received signal in each of the at least previous two slots;
- storing an amplitude measurement for each slot associated with the received signal; and
- computing an estimate amplitude for a current slot of the received signal based on a weighted average of the stored amplitude measurement for each of the at least two previous slots associated with the received signal, the stored amplitude measurements being weighted based on the stored TPC commands associated with the received signal.

* * * * *